United States Patent
Cooper (10) Patent No.: US 12,101,395 B2
(45) Date of Patent: Sep. 24, 2024

(54) CRYPTOGRAPHIC LOCK-AND-KEY GENERATION, DISTRIBUTION, AND VALIDATION

(71) Applicant: NCR Atleos Corporation, Atlanta, GA (US)

(72) Inventor: Jeffrey Stephen Cooper, Kitchener (CA)

(73) Assignee: NCR Atleos Corporation, Atlanta, GA (US)

( * ) Notice: Subject to any disclaimer, the term of this patent is extended or adjusted under 35 U.S.C. 154(b) by 206 days.

(21) Appl. No.: 17/036,510

(22) Filed: Sep. 29, 2020

(65) Prior Publication Data

US 2022/0103351 A1    Mar. 31, 2022

(51) Int. Cl.
| | |
|---|---|
| *H04L 9/08* | (2006.01) |
| *G06F 13/10* | (2006.01) |
| *G07C 9/00* | (2020.01) |
| *G16Y 10/75* | (2020.01) |
| *G16Y 30/10* | (2020.01) |
| *H04L 9/14* | (2006.01) |

(52) U.S. Cl.
CPC ............ *H04L 9/0825* (2013.01); *G06F 13/10* (2013.01); *G07C 9/00182* (2013.01); *G16Y 10/75* (2020.01); *G16Y 30/10* (2020.01); *H04L 9/0891* (2013.01); *H04L 9/14* (2013.01); *G07C 2009/00412* (2013.01)

(58) Field of Classification Search
CPC ....... H04L 9/0825; H04L 9/0891; H04L 9/14; G06F 13/10
See application file for complete search history.

(56) References Cited

U.S. PATENT DOCUMENTS

| | | | | |
|---|---|---|---|---|
| 10,769,873 | B1* | 9/2020 | Sun | H04L 9/3247 |
| 2002/0018566 | A1* | 2/2002 | Kawatsura | G06F 21/10 |
| | | | | 380/232 |
| 2005/0152542 | A1* | 7/2005 | Zheng | H04L 9/3213 |
| | | | | 380/30 |
| 2007/0098175 | A1* | 5/2007 | Jakubiec | H04L 9/0891 |
| | | | | 380/277 |
| 2007/0223706 | A1* | 9/2007 | Gantman | G06F 21/602 |
| | | | | 380/286 |

(Continued)

*Primary Examiner* — Phy Anh T Vu
(74) *Attorney, Agent, or Firm* — Schwegman Lundberg & Woessner, P.A.

(57) ABSTRACT

Cryptographic techniques are provided for generating, distributing, validation, and processing secure commands on different devices and/or peripherals. A control device generates and encrypts a key corresponding to a secure command using a private key of control device to produce a key envelope. Control device further encrypts the key envelope with a recipient's public key producing a recipient envelope. The recipient envelope is delivered to a recipient's device. The recipient's device decrypts the recipient envelope with a private key of the recipient's device producing the key envelope. The key envelope is delivered back to the control device. The control device decrypts the key envelope producing the key, validates the key, and processes a secure command on behalf of a secure resource or delivers the secure command to the secure resource for processing. In an embodiment, control device maintains audit records/audit trail, which is maintained on the control device.

11 Claims, 5 Drawing Sheets

(56) References Cited

U.S. PATENT DOCUMENTS

| | | | |
|---|---|---|---|
| 2012/0204032 A1* | 8/2012 | Wilkins | H04L 9/321 |
| | | | 713/170 |
| 2014/0093084 A1* | 4/2014 | De Atley | G06F 21/64 |
| | | | 380/277 |
| 2015/0222621 A1* | 8/2015 | Baum | H04L 63/0807 |
| | | | 726/9 |
| 2015/0248674 A1* | 9/2015 | Han | G06Q 20/341 |
| | | | 705/43 |
| 2016/0063781 A1* | 3/2016 | Whytock | G07C 9/00571 |
| | | | 340/5.61 |
| 2016/0182493 A1* | 6/2016 | Volini | H04L 63/08 |
| | | | 713/158 |
| 2017/0111444 A1* | 4/2017 | Saheba | H04L 67/1012 |
| 2018/0205743 A1* | 7/2018 | McIver | H04L 9/14 |
| 2018/0285871 A1* | 10/2018 | Long | G06Q 20/405 |
| 2019/0268325 A1* | 8/2019 | Roper | H04L 63/083 |
| 2019/0370487 A1* | 12/2019 | Veltman | H04L 9/3213 |
| 2019/0372993 A1* | 12/2019 | Dunjic | H04L 9/3268 |
| 2021/0243028 A1* | 8/2021 | Song | H04L 9/3228 |
| 2022/0085993 A1* | 3/2022 | Kumar | H04L 9/002 |
| 2022/0094546 A1* | 3/2022 | Ying | H04W 12/122 |
| 2022/0158846 A1* | 5/2022 | Ray | H04L 9/0825 |
| 2022/0345298 A1* | 10/2022 | Cap | H04L 9/0869 |
| 2023/0208621 A1* | 6/2023 | Gottschalk | H04L 9/3268 |
| | | | 713/171 |

* cited by examiner

FIG. 1A

Unlock Command Preparation – Deliver to recipient

FIG. 1B

Re-encrypt Key For Recipient

CRYPTOGRAPHIC LOCK-AND-KEY GENERATION, DISTRIBUTION, AND VALIDATION

BACKGROUND

Nearly every conceivable mechanical device is now equipped with networking and processing capabilities; for example, doorbells, refrigerators, appliances, garage doors, doors, faucets, and many others. Peripheral devices have also been equipped with independent network capabilities and/or extended processor capabilities; for example, printers, scanners, payment card readers, displays, cameras, cash drawers, terminal-integrated safes, and others. There are also standalone voice-enabled network devices that can communicate with these mechanical devices and peripheral devices over wired and/or wireless networks; for example, Siri®, Echo®, Google Home®, and still others. All these various devices are now collectively referred to as Internet-of-Things (IoT) devices (intelligent appliances/peripherals).

Security is a substantial problem with IoT devices, because if a network connection to these devices can be hacked, the hacker can perform harmful operations, such as opening a safe, opening a door, watching a live video feed, etc. Many IoT devices require some type of security before access is granted for performing operations, but the on-device security is weak and easily compromised (typically just a password is required, and the password is often provided of an insecure network connection).

As a result, many enterprises have been reluctant to embrace IoT technology and devices. In fact, some industries, such as the financial industry, may currently be prohibited from using IoT technology because of strict government regulations regarding security for financial transactions. Additionally, financial transactions require proof of non-repudiation with a demonstrable audit trail, which is currently unavailable with IoT techniques within the financial industry.

SUMMARY

In various embodiments, methods and a system for cryptographic lock-and-key generation, distribution, and validation are presented, According to an embodiment, a method for cryptographic lock-and-key generation, distribution, and validation is presented. For example, a key is generated for access to a resource and the key is encrypted with a private key of a device to produce a key envelope. The key envelope is further encrypted with a public key of a recipient to produce a recipient envelope. The recipient envelope is provided to a server. Subsequently, the key envelope is received from a requestor and the key envelope is decrypted with the private key to produce the key. A command is processed on behalf of or issued to the resource causing the resource to provide access defined by the key to the requestor.

DETAILED DESCRIPTION

FIG. 1 is a diagram of a system 100 for cryptographic lock-and-key generation, distribution, and validation, according to an example embodiment. It is to be noted that the components are shown schematically in greatly simplified form, with only those components relevant to understanding of the embodiments being illustrated.

Figure 1A:
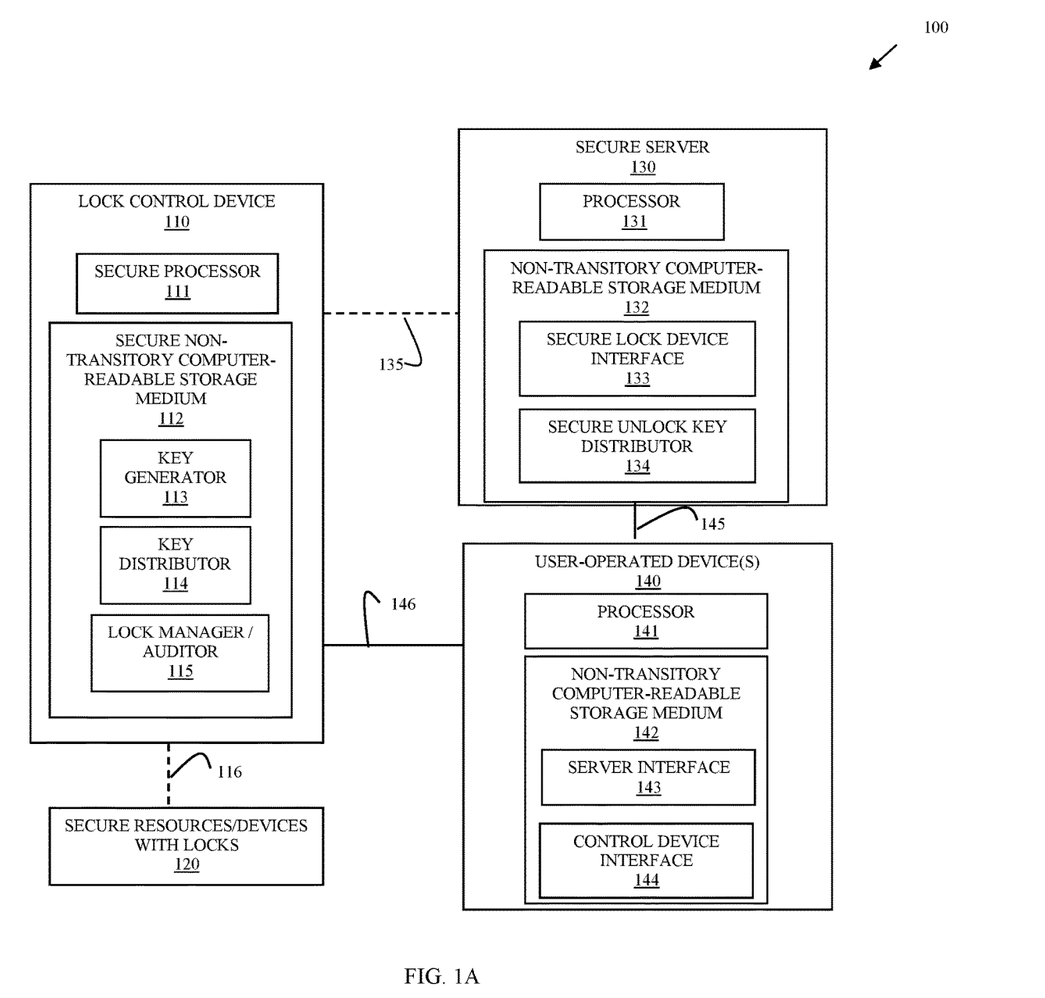
FIG. 1A is a diagram of a system for cryptographic lock-and-key generation, distribution, and validation, according to an example embodiment.

Furthermore, the various components (that are identified in the FIG. 1) are illustrated and the arrangement of the components is presented for purposes of illustration only. It is to be noted that other arrangements with more or less components are possible without departing from the techniques of cryptographic lock-and-key generation, distribution, and validation, presented herein and below.

As used herein and below, the terms "customer," "consumer," "user," "engineer," "customer engineer," and "service engineer" may be used interchangeably and synonymously, The system 100 includes a lock control device 110, secure resources/devices having locks, a secure server 130, and a plurality of user-operated devices 140.

Lock control device comprises a secure processor 111 and a secure non-transitory computer-readable storage medium 112. Medium 112 comprising executable instructions for a key generator 113, a key distributor 114, and a lock manager/auditor 115.

Secure resources/devices with locks 120 comprise electromechanical devices that have physical or logical locks requiring a key to unlock. Devices with locks 120 may comprises devices that are attached or interfaced to lock control device 110 or devices that are accessible to lock control device 110 over a secure network connection (encrypted and wired and/or encrypted and wireless). Secure resources/devices with locks 120 may or may not include processors and non-transitory computer-readable storage mediums having executable instructions. That is, in some cases devices with locks 120 may be electromechanical and attached directly to lock control device 110, such that a signal to unlock from lock control device 110 causes a lock to be unlocked for access on a device with a lock 120 (in such a case this type of device with a lock 120 does not require a processor). In other cases, the secure resource/device with locks 120 may be any computing device, peripheral device, and/or IoT device comprising a processor and non-transitory computer-readable storage medium having executable instructions for receiving unlock commands from control device 110, unlocking the corresponding device 120 in response to the unlock command, providing the unlock command to another connected device to the corresponding device 120, network interaction over secure connection 116, and/or network interaction over other networks to other connected devices interacting with corresponding device 120.

Secure server 130 comprises a processor 131 and a non-transitory computer-readable storage medium 133, Medium 132 comprises executable instructions for a secure lock device interface 133 and a secure unlock key distributor 134.

Each user-operated device 140 comprising a processor 141 and a non-transitory computer-readable storage medium 142. Medium 142 comprising executable instructions for a server interface 143 and control device interface 144.

Each of the above-noted devices having corresponding processors execute the corresponding executable instructions from the corresponding mediums causing the corresponding processors to perform processing discussed herein and below with respect to instructions 113, 114, 115, 133, 134, 143, and 143.

Control device 110 controls generation of unlock keys via a secure processor 111 through key generator 113. Key generator 113 provides a single active key for unlocking a specific device with lock 120 at any given point in time, such that two unlock keys for a given device with lock 120 is not available. Each unlock key is also associated with a specific command recognized by a specific device with lock 120, such that multiple commands recognized by a device with lock 120 can have multiple corresponding unlock keys. Furthermore, the corresponding unlock keys are never exposed from control device 110 and are never communicated over any network connection 116 or 135.

Key generator 113 generates unlock keys using a random number generator and hash algorithm known only to control device 110. Any generated unlock key is then encrypted using a private device key stored in secure storage of control device 110 (the device or private key may also be manufactured within secure storage of control device 110). The private key is never communicated from or accessible through an interface on control device 110; only key generator 113 and lock manager/auditor 115 have access to the device or private key on control device 110.

Secure lock device interface 133 makes key requests for specific resources/devices with locks 120 and/or for specific commands of specific resources/devices with locks 120 to key distributor 114 over a secure connection 135. Secure connection 135 is an encrypted communication connection between secure server 130 and control device 110. Control device 110 and secure server 130 are in a trusted and secure relationship with one another. The key requests also include a specific recipient (user/customer or service engineer) and that specific recipient's public key. This ensures that only a recipient having that recipients corresponding private key can decrypt any unlock key (as described further below).

Key distributor 114 receives the key requests over secure connection 135 and obtains a new unlock key for a given device with lock 120 or for a specific command of a specific device with lock 120 along with the recipients public key and key distributor 114 encrypts the obtained new unlock key first with the private key of control device 110 the creates a key envelope. Next, key distributor 114 encrypts key envelope with the public key of the recipient creating an outer envelope or recipient envelope. Key distributor 114 then delivers the recipient envelope back to secure lock device interface over secure connection 135.

Secure lock device interface 133 provides the recipient envelope to secure unlock key distributor 134, which may store and manage distribution of the recipient envelope to the corresponding recipient. The recipient authenticates through an authentication mechanism required for access to secure server 130 over an insecure or secure connection 145 and makes a request for the recipient envelope be delivered to the recipient on user-operated device 140; assuming the recipient envelope request is authorized by secure unlock key distributor 134, the recipient envelope is provided to the recipient over connection 145.

It is noted that the original key request made by secure lock device interface 133 to key distributor may be processed in response to the recipient authenticating for receiving the recipient envelope (so secure unlock key distributor 134 may or may not retain recipient envelopes in advance of the corresponding recipient envelope requests).

Once the recipient obtains the recipient envelope, control device interface 144 decrypts the recipient envelope using the device or private key of user-operated device 140. This produces the key envelope original produced by key distributor 114.

Next, recipient of the recipient envelope operates control device interface 144 for establishing a connection 146 with control device 110. Connection 144 may be secure or may not be secure. Moreover, connection 144 may be proximity based meaning a low energy Radio Frequency (RF) connection is required for connecting device 140 to device 110 (such as through Near Field Communication (NFC) or Low Energy (LE) Bluetooth®). That is, control device 110 may only permit connection 146 via a LE Bluetooth® transceiver of NEC transceiver; ensuring that recipient device 140 is in close physical proximity to control device 110 before any connection 146 is even possible. In other cases, connection 146 may be wireless over a Local Area Network (LAN) and/or a Wide Area Network (WAN). In still more cases, connection 146 may be over a combination of wired and wireless connections between device 140 and device 110.

Once connection 146 is established, the key envelope is provided from control device interface 144 to lock manager/auditor 115. Lock manager 115 decrypts the key envelope with the private or device key of control device 110 and obtains the original generated unlock key for a given resource/device with lock 120 or for a given command that is to be processed for or by a given resource/device with lock 120. Lock manager/auditor 115 then processes the command on behalf of the corresponding resource/device with lock 120 or delivers the command over secure connection 116 (wired, wireless, or combination of wired and wireless) to the corresponding resource/device with lock for processing. This results in the corresponding device with lock 120 unlocking a physical lock or a logical lock providing access to a resource by unlocking the lock to the resource.

The resource may comprise a device (an Automated Teller Machine (ATM), a Self-Service Terminal (SST), a Point-Of-Sale (POS) terminal, a kiosk, a laptop, a desktop, a phone, a wearable processing device, a tablet, an IoT device, a device integrated into a vehicle, etc.), a peripheral of a device, a safe, a cash drawer, a secure housing, storage locker, door, any secure container, a secure application that processes on the corresponding device with lock 120 (an administrative interface, a secure website interface provided through device with lock 120), etc.

When a recipient provides a key envelope for access to or for unlocking a resource associated with the secure resources/devices with locks 120 and lock manager/auditor 115 is unable to match and verify the key envelope to a corresponding unlock key, access is denied and connection 146 is terminated. This causes an audit event to be recorded by lock manager/auditor in an audit trail (log). This may also cause lock manager/auditor 115 to immediately raise an even to key distributor 114, which is immediately communicated to secure lock device interface 133.

A variety of embodiments to the above-referenced processing of system 100 is also provided, For example, key generator 113 may generate restrictions for the generated unlock key as metadata maintained and enforced with use of the unlock key by lock manager/auditor 115. This metadata may be provided by secure lock interface 133 as policies over connection 135 with the key requests (may also be referred to herein as "unlock key requests") that cause the unlock keys to be generated by key generator 113. The policies may dictate conditions for which the unlock key can be used and/or conditions for which the unlock key is considered to be expired and no longer usable. For example, a policy may comprise expiry conditions that the unlock key should expire on a given date, a given time of a given day, a given period of elapsed time from a date and time that the unlock key is generated, not after a given date, etc. In another case, a policy may comprise use conditions that the unlock key is only usable on particular times of a day, on particular days of the week, on particular time of a particular day, when user-operated device 140 is connected over 146 using a low energy wireless connection (ensuring the recipient is in close physical proximity to control device 110), etc. The key request provided by secure lock device interface 133 to key generator 113 over secure connection 135 may also comprise multiple policies (both expiry conditions and use conditions). Key generator 113 maintains the conditions of the policy as metadata with the generated unlock keys and lock manager/auditor 115 enforces the conditions associated with the maintained metadata for the corresponding unlock keys when provided the key envelope from control device interface 144.

As another embodiment, lock manager/auditor 115 may maintain audit metrics in a log for all received key requests and all received key envelopes from recipients via their corresponding control device interfaces 144 of their corresponding user-operated devices 140, The audit metrics for a given generated unlock key, a given request to use that unlock key, and given unlock command sent to a corresponding resource/device with lock associated with that unlock key is maintained as an audit record in an audit trail that is maintained on control device 110. Key distributor 114 may provided any given audit record or the entire audit trail upon request by secure lock device interface 133 over secure connection 135, after access was granted to a given resource/device with lock 120, after a failed attempt at access was made by a recipient, and/or at preconfigured intervals of time, Secure lock device interface 133 may separately maintain audit records and an audit trail for each secure resource/device with locks and use the audit records and audit trail from control device 110 to investigate non-compliance or discrepancies.

In still another embodiment, secure lock device interface 133 and secure unlock key distributor 134 exclusively manage decrypting and providing the recipient keys to the recipients, That is, key generator 113 does not produce the recipient envelope; it is both produced and delivered through server 130. In this embodiment, key generator 113 produces the unlock keys as described above; however, key distributor 114 produces server envelopes that are encrypted by encrypting the unlock keys with the private key of device 110 (as previously discussed) to produce the key envelopes, then key distributor 114 further encrypts the key envelopes with a public key of the server 130 producing the server envelopes. Secure unlock key distributor 134 then decrypts the server envelope with a private key of the server to get the key envelopes, the key envelopes are then distributed to authenticated recipients by the secure unlock key distributor 134 encrypting the key envelopes with the corresponding recipients' public keys producing the corresponding recipient envelops, which are delivered to the corresponding recipients. The key envelops corresponding to specific unlock or access commands to the specific resources/devices with locks 120.

Figure 1B:
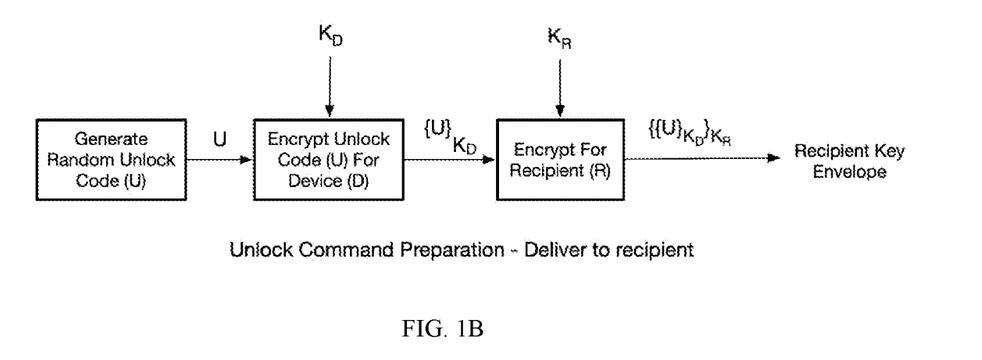
FIG. 1B is a diagram of a process flow for the system of FIG. 1A illustrating unlock key generation, according to an example embodiment.

FIG. 1B is a diagram of a process flow for the system of FIG. 1A illustrating unlock key generation, according to an example embodiment.

The process flow of FIG. 1B illustrates generation of an Unlock key for a given recipient to access or unlock a given resource associated with a given resource/device with lock. A random unlock code (U) is generated by key generator 113 and the U is encrypted by key generator 113 with the private and device key of device 110 producing a key envelope $\{U\}_{KD}$. Once an unlock key request is received from secure lock device interface 133 for a specific recipient with that recipient's public key, key generator 113 further encrypts the $\{U\}_{KD}$ with the recipients public key producing the recipient envelope $\{\{U_{KD}\}\}_{KR}$, which is then subsequently delivered to the recipient on the recipient's device 140 by secure unlock key distributor 134.

Figure 1C:
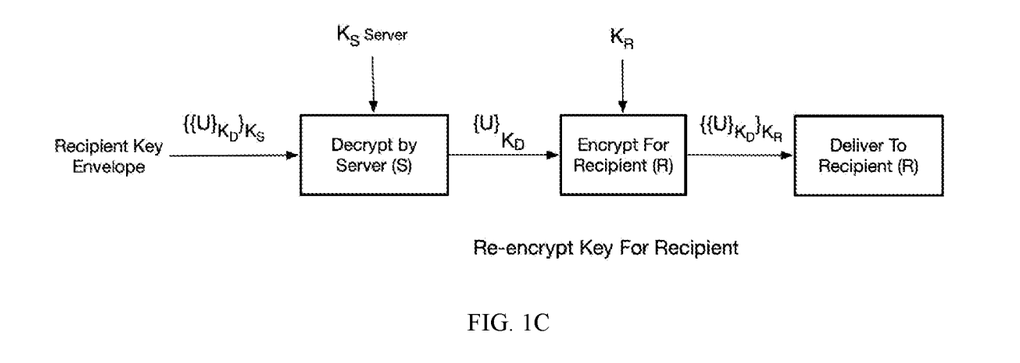
FIG. 1C is a diagram of a process flow for the system of FIG. 1A illustrating unlock key distribution, according to an example embodiment.

FIG. 1C is a diagram of a process flow for the system of FIG. 1A illustrating unlock key distribution, according to an example embodiment This embodiment was discussed above, control device 110 produces key envelopes as previously discussed. Key generator 113 then produces server envelopes by encrypting the key envelopes with a public key of server 130. Server 130 then produces and delivers each of the corresponding recipient envelopes to the corresponding recipients using the public keys of the corresponding recipients.

So, as shown in FIG. 1C, secure lock device interface 133 receives a recipient envelope where the recipient is the server 130 (e.g., the first use of recipient envelope in FIG. 1C is the server envelope (shown as $\{\{U\}_{KD}\}_{KS}$ discussed above provided by key distributor 114 to secure lock device interface 133). Control device interface 144 then decrypts $\{\{U\}_{KD}\}_{KS}$ with the private key of the server K Server producing the key envelope $\{U\}_{KD}$, and encrypts $\{\{U\}_{KD}$ with the public key ($K_R$) of a specific recipient producing the recipient envelope $\{\{U\}_{KD}\}_{KR}$, which is delivered to the specific recipient, FIG. 1D is a diagram of a process flow for the system of FIG. 1A illustrating unlock key validation, according to an example embodiment.

Figure 1D:
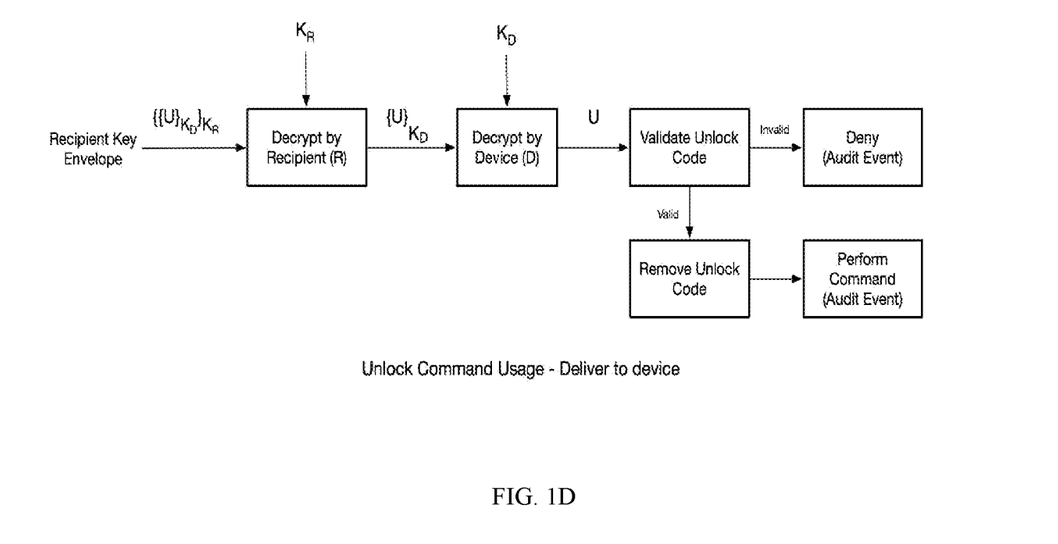
FIG. 1D is a diagram of a process flow for the system of FIG. 1A illustrating unlock key validation, according to an example embodiment.

The process flow of FIG. 1D illustrates processing by the control device interface 144 of device 140 and lock manager/auditor 115 of control device 110 when the recipient is requesting access or an unlock of a resource/device with lock 120. Server interface 143 receives the recipient envelope $\{\{U\}_{KD}\}_{KR}$ from secure unlock key distributor 134 over connection 145. Control device interface 144 then decrypts the recipient envelope $\{\{U\}_{KD}\}_{KR}$ using the recipient's private key producing the key envelope $\{U\}_{KD}$. The key envelope is sent by control device interface 144 over connection 146 to lock manager/auditor 115. Lock manager/auditor 115 decrypts the key envelope with the control device private key producing the unlock key U, and the lock manager/auditor 144 validates that the unlock key exists, if it does not then connection 146 is terminated.

If the unlock key is matched, then the lock manager/auditor 115 removes the unlock key/code from device 110 and sends the necessary command to the corresponding resource/device with lock 120 or processes the corresponding command or instruction on behalf of the corresponding resource/device with lock 120 (for resource/device with lock 120 that is integrated into device 110). Any matched unlock key is removed before processing the corresponding command associated with the unlock key; this ensures that there is the unlock key can be used only once and is not being provided a second time while lock manager/auditor 115 is issuing or processing the command associated with the unlock key.

System 100 provides a non-repudiation and auditable record when a secure command, associated with unlocking a resource or associated with processing an operation on a resource, is processed by the authorized and intended recipient. That is, an auditable record proves that an intended recipient both received, provided, and caused a secure command to be processed on behalf of the intended recipient, such that the recipient cannot deny (repudiate) the secure command being processed. This has particular benefit in the financial industry but may be beneficial in a wide array of other industries. Reluctance of industries to embrace IoT technology because of lack of compliance with governmental security regulations can be alleviated with system 100. The non-repudiation does not rely on any external audit trans that may be forged, since control device 110 maintains a local record of transactions and an audit trail of all transactions, which may be used to corroborate a centrally stored audit trail on server 120 in the event of any discrepancies.

Further, system 100 provides processing for fine-grain control of each unlock code or secure command through metadata maintained with the unlock keys (codes) on control device 110. The metadata can be defined by server 120 as policies comprising conditions for both expiry of the codes and/or use of the codes.

Moreover, system 100 is resistant to replay attacks because the unlock code (or secure command) may only be used by the designated recipient and further may only be used by the intended recipient once.

In an embodiment, system 100 may comprise cryptographic hardware on control device 110 to provide additional layers of security protection. Additionally, system 100 may comprise a general purpose (Hardware Security Model) for server 130 to further protect recipient unlock keys/codes or provide additional software that secures keys/codes on recipient's device 140.

In an embodiment, control device 110 is a stand-alone and independent device dedicated to key code generation, distribution, validation, and secure command processing with secure resources/devices with locks 120. This limits security vulnerabilities. Moreover, resources/devices with locks 120 do not share keys/codes, such that a key/code generated for one device 120 is unusable by a different device 120.

In an embodiment, control device 110 is a specialized IoT device having network secure connections 116 to secure resources/devices with locks 120.

In an embodiment, the control device 110 is a specialized server.

In an embodiment, control device 110 is integrated into a different device, such as an ATM, a SST, a POS terminal, or a kiosk.

In an embodiment, control device 110 is a mobile device, such as a phone, a tablet, a laptop, and a wearable processing device dedicated to the processing discussed herein and above.

In an embodiment, server 130 is one of multiple servers that comprise a cloud processing environment (cloud).

In an embodiment, user-operated devices 140 comprise: phones, tablets, laptops, wearable processing devices, servers, and/or desktops.

In an embodiment, secure resources/devices with locks 120 comprise ATMs, POS terminals, SSTs, kiosks, a laptop, a desktop, a phone, a wearable processing device, a tablet, an IoT device, a device integrated into a vehicle, a peripheral of a device, a safe, a cash drawer, a secure housing, storage locker, door, a cabinet, any secure container, and/or a secure application that processes on the corresponding device with lock 120 (e.g., an administrative interface, a secure website interface provided through corresponding device with lock 120).

As used herein a "lock" may be a physical lock or a logical lock, which requires a key/code to authenticate for access.

These and other embodiments are now discussed with reference to FIGS. 2-3.

Figure 2:
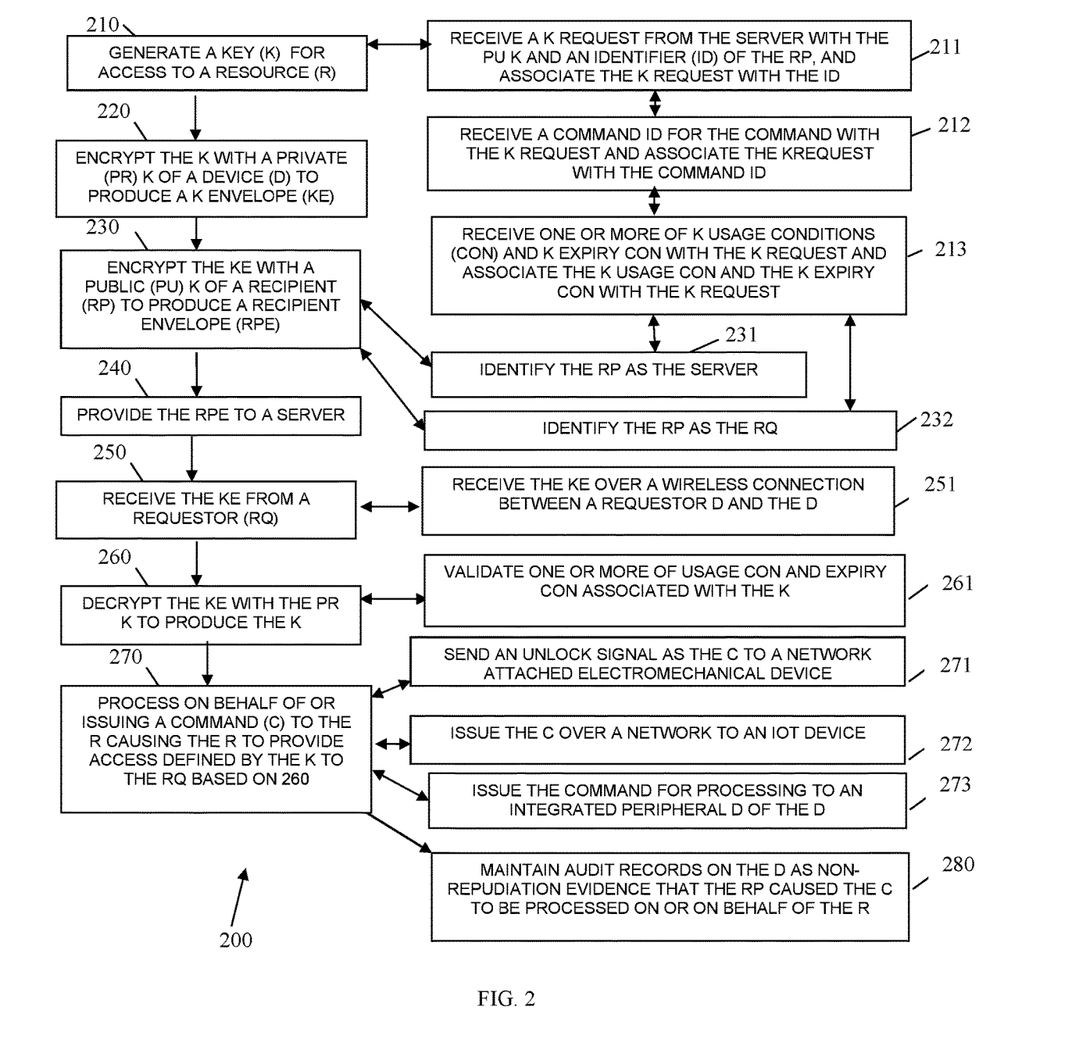
FIG. 2 is a diagram of a method for cryptographic lock-and-key generation, distribution, and validation, according to an example embodiment.

FIG. 2 is a diagram of a method 200 for cryptographic lock-and-key generation, distribution, and validation, according to an example embodiment. The software module(s) that implements the method 200 is referred to as a "secure key manager." The secure key manager is implemented as executable instructions programmed and residing within memory and/or a non-transitory computer-readable (processor-readable) storage medium and executed by one or more processors of a device. The processor(s) of the device that executes the secure key manager are specifically configured and programmed to process the secure key manager. The device that executes the secure key manager has access to one or more network connections during its processing. The network connections can be wired, wireless, or a combination of wired and wireless.

In an embodiment, the device that executes the secure key manager is lock control device 110 and any embodiment of lock control device 110 discussed above with FIGS. 1A-1D.

In an embodiment, the secure key manager is all of or some combination of the process flow of FIG. 1B, the process flow of FIG. 1C, the process flow of FIG. 1D, key generator 113, key distributor 114, and/or lock manager/auditor 115.

At 210, the secure key manager generates a key for access to a resource.

In an embodiment, at 211, the secure key manager receives a key request from a server with a public key and an identifier for a recipient and the secure key manager associates or links the key with the resource identifier and public key of the recipient.

In an embodiment of 211 and at 212, the secure key manager receives a command identifier for a command with the key requests and the secure key manager associates or links the key with the command identifier.

In an embodiment of 212 and at 213, the secure key manager receives one or more of key usage conditions and key expiry conditions and the secure key manager associates the key request with the key usage conditions and the key expiry conditions.

At 220, the secure key manager encrypts the key with a private key of the lock control device 110 to produce a key envelope.

At 230, the secure key manager encrypts the key envelope with a public key of a recipient to produce a recipient envelope.

In an embodiment of 213 and 230, at 231, the secure key manager identifies the recipient as the server that is requesting the key.

In an embodiment of 213 and 230, at 232, the secure key manager identifies the recipient as a requestor different from the server that requested the key.

At 240, the secure key manager provides the recipient envelope to the server.

At 250, the secure key manager receives the key envelope from a requestor.

In an embodiment, at 251, the secure key manager receives the key envelope over a wireless connection between a requestor device of the requestor and the lock control device 110.

At 260, the secure key manager decrypts the key envelope with the private key of the lock control device 110 to produce the key.

In an embodiment, at 261, the secure key manager validates one or more usage conditions and/or expiry conditions associated with the key.

At 270, the secure key manager processes on behalf of or issues a command to the resource causing the resource to provide access defined by the key to the requestor based on 260.

In an embodiment, at 271, the secure key manager sends an unlock signal as the command to a network-attached electromechanical In an embodiment, at 272, the secure key manager issues a command over a network to an IoT device for processing of the command by the IoT device.

In an embodiment, at 273, the secure key manager issues the command for processing to an integrated peripheral device of the lock control device 110.

In an embodiment, at 280, the secure key manager maintains audit records on the lock control device 110 as non-repudiation evidence that the requestor caused the command to be processed on or on behalf of the requestor.

Figure 3:
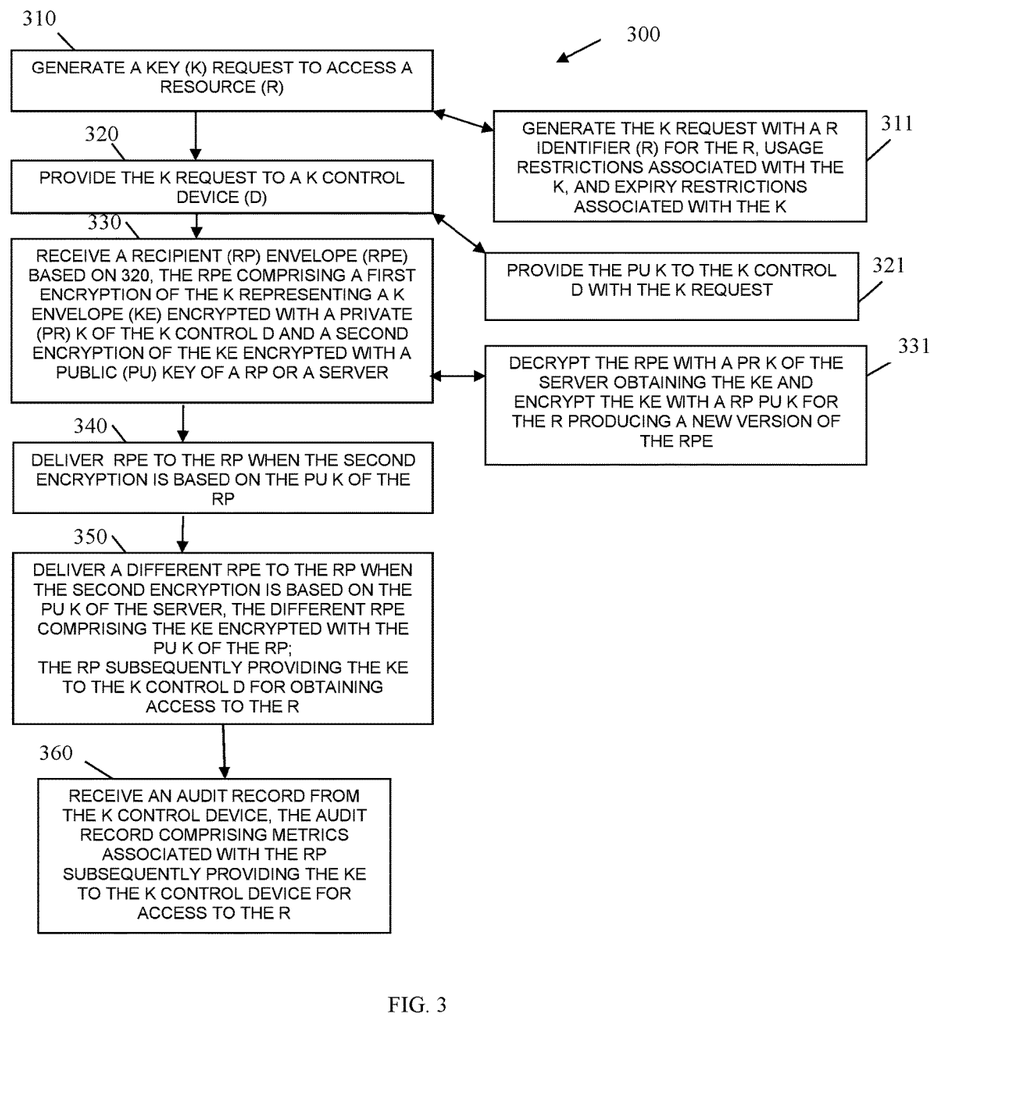
FIG. 3 is a diagram of another method for cryptographic lock-and-key generation, distribution, and validation, according to an example embodiment.

FIG. 3 is a diagram of another method 300 for cryptographic lock-and-key generation, distribution, and validation, according to an example embodiment. The software module(s) that implements the method 300 is referred to as a "secure key distributor." The secure key distributor is implemented as executable instructions programmed and residing within memory and/or a non-transitory computer-readable (processor-readable) storage medium and executed by one or more processors of a device. The processors that execute the secure key distributor are specifically configured and programmed to process the secure key distributor. The device that executes the secure key distributor has access to one or more network connections during its processing. The network connections can be wired, wireless, or a combination of wired and wireless.

In an embodiment, the device that executes the secure key distributor is server 130. In an embodiment, server 130 is one of multiple servers that logically cooperate over a network as a single server representing a cloud processing environment (cloud).

In an embodiment, the secure key distributor is all of or some combination of the process flow of FIG. 1B, the process flow of FIG. 1C, the process flow of FIG. 1D, secure lock device interface 133, secure unlock key distributor 134, and/or method 200 of FIG. 2.

At 310, the secure key distributor generates a key request to access a resource.

In an embodiment, at 311, the secure key distributor generates the key request with a resource identifier for the resource, usage restrictions associated with the key, and expiry restrictions associated with the key.

At 320, the secure key distributor provides the key request to a key control device (lock control device 110).

In an embodiment, at 321, the secure key distributor provides a public key to the key control device with the key request.

At 330, the secure key distributor receives a recipient envelope based on 320. The recipient envelope comprising 1) a first encrypting of the key representing a key envelope encrypted with a private key of the key control device and 2) a second encrypting of the key envelope encrypted with a public key of a recipient or the server (the server that executes the secure key distributor).

In an embodiment, at 331, the secure key distributor decrypts the recipient envelope with a private key of the server obtaining the key envelope and the secure key distributor encrypts the key envelope with a recipient public key for the recipient producing a new version of the recipient envelope.

At 340, the secure key distributor delivers the recipient envelope to the recipient when the second encryption was based on the public key of the recipient at 330.

At 350, the secure key distributor delivers a different recipient envelope to the recipient when the second encryption is based on the public key of the server at 330. The different recipient envelope comprises the key envelope encrypted with public key of the recipient.

The recipient subsequently provides the key envelope to the key control device for obtaining access to the resource.

At 360, the secure key distributor receives an audit record from the key control device. The audit record comprises metrics associated with the recipient subsequently providing the key envelope to the key control device for access to the resource.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    receiving, by a control device, a key request from a server, the key request containing a public key of a recipient device and an identifier of a second device associated with a resource;
    in response to the receiving, generating, by the control device, a key for access to the resource, the key being associated with the identifier and a command identifier associated with the key request;

wherein the control device is separate from a the second device, wherein the control device is integrated into a terminal, the terminal is an automated teller machine, a self-service terminal, a point-of-sale terminal, or a kiosk, and wherein the second device is a peripheral device of the control device;

encrypting, by the control device, the key with a private key of the control device to produce a key envelope;

encrypting, by the control device, the key envelope with the public key of the recipient device to produce a recipient envelope;

providing, by the control device, the recipient envelope to the server, wherein the server delivers the recipient envelope to the recipient device after a recipient associated with the public key of the recipient device authenticates to the server;

receiving, by the control device, the key envelope from a requestor, wherein the recipient device decrypts the recipient envelope with a recipient private key maintained on the recipient device to obtain the key envelope and send the key envelope to the control device;

decrypting, by a control device, the key envelope with the private key to produce the key;

upon successfully validating the key decrypted, processing, by the control device, on behalf of or issuing a command corresponding to the command identifier to the second device associated with the resource causing the second device to provide access to the resource as defined by the key to the requestor based on the decrypting; or upon unsuccessfully validating the key decrypted, remove the key decrypted and terminate connection.

2. The method of claim 1, wherein the receiving further includes receiving one or more of key usage conditions and key expiry conditions with the key request and associating the key usage conditions and the key expiry conditions with the key.

3. The method of claim 2, wherein the encrypting the key further includes identifying the recipient device as the server.

4. The method of claim 2, wherein the encrypting the key further includes identifying the recipient device as a certain device operated by the requestor.

5. The method of claim 1, wherein the receiving further includes receiving the key envelope over a wireless connection between a certain device operated by the requestor and the control device.

6. The method of claim 1, wherein the decrypting further includes validating one or more of usage conditions and expiry conditions associated with the key.

7. The method of claim 1, wherein the processing further includes removing the key before processing on behalf of or issuing the command to the second device the resource.

8. The method of claim 1, wherein the processing further includes sending an unlock signal as the command to a networked attached electromechanical device.

9. The method of claim 1, wherein the processing further includes issuing the command over a network to an Internet-of-Things (IoT) device.

10. The method of claim 1, wherein the processing further includes issuing the command to an integrated peripheral device of the control device.

11. The method of claim 1 further comprising, maintaining, by the control device, audit records on the control device as non-repudiation evidence that the recipient device caused the command to be processed on the second device and on behalf of the resource.

* * * * *